(12) United States Patent
Ryan et al.

(10) Patent No.: US 7,251,623 B1
(45) Date of Patent: Jul. 31, 2007

(54) METHOD FOR MANAGING A FINANCIAL SECURITY

(75) Inventors: Richard K Ryan, Carbondale, KS (US); Brandt Thomas Brock, Auburn, KS (US); Gregory J. Garvin, Topeka, KS (US); Stéphane Goyer, Topeka, KS (US); Brenda Marie Harwood, Topeka, KS (US); Amy Jo Lee, Lawrence, KS (US); Mary Elaine Nestor, Topeka, KS (US); Karen S. Plush, Topeka, KS (US); Kris Alan Robbins, Topeka, KS (US)

(73) Assignee: Security Benefit Life Insurance Company, Topeka, KS (US)

( * ) Notice: Subject to any disclaimer, the term of this patent is extended or adjusted under 35 U.S.C. 154(b) by 535 days.

(21) Appl. No.: 09/606,495

(22) Filed: Jun. 29, 2000
(Under 37 CFR 1.47)

(51) Int. Cl.
*G06Q 40/00* (2006.01)
(52) U.S. Cl. .......................................... 705/35; 705/36
(58) Field of Classification Search ............. 705/35–45
See application file for complete search history.

(56) References Cited

OTHER PUBLICATIONS

Dictionary of Finance and Investment Terms, 1985, p. 157.*

* cited by examiner

*Primary Examiner*—Richard Weisberger
(74) *Attorney, Agent, or Firm*—Stinson Morrison Hecker LLP

(57) ABSTRACT

A financial security product and method for managing a financial security, such as a variable annuity, which enables financial service providers to deduct the fees, costs and expenses associated with managing the financial security product. In a preferred embodiment, the method enables financial service providers to provide optional benefits to investors of a financial security without the need for maintaining separate unit prices for each potential combination of optional benefits. The method comprises periodically declaring a dividend with respect to the financial security and deducting at least a portion of the fees associated with managing the financial security from the declared dividend. The amount of the fees can vary depending upon the number of optional benefits, if any, selected to be provided with the financial security by the investor. In a preferred embodiment, any remaining dividend after the fees have been deducted is reinvested into the financial security.

In a preferred embodiment, the process for declaring the dividend, assessing and deducting the management fees, reinvesting the remainder of the dividend and determining the new value of the financial security is accomplished using a series of calculations via an automated system such as a computer program.

5 Claims, No Drawings

METHOD FOR MANAGING A FINANCIAL SECURITY

BACKGROUND OF THE INVENTION

1. Field of the Invention

The present invention relates generally to a financial security product and management system and, is more specifically directed to a financial security product and methodology for deducting the fees and costs associated with the management of a financial security from a periodically declared dividend.

2. Description of Related Art

Financial securities such as variable annuities or mutual funds, are managed by financial service providers in return for a fee. Investors buy units of the financial security at a certain price in the belief that the price of the units will appreciate. In the past, the fee (including expenses and costs) associated with managing these securities was regularly charged to the investor's account. This would typically result in a reduction in the number of units of the financial security held by the investor or a reduction in any cash reserves in the account. These reductions were not well received by investors. Investors were confused by the amount and purpose of the reductions. In addition, the reductions left a negative impression of the investment insofar as the number of units was decreased as opposed to increased over certain periods of time.

In an effort to overcome these objections, many financial service providers began periodically deducting the fee as a flat percentage fee of the unit price or valuation of the financial security. While this unit price deduction method is useful, it restricts the financial service provider's flexibility in offering multiple options to its customers. If a financial service provider wants to offer its customers a financial security product with several optional benefits, it can offer each optional benefit and combination of optional benefits as part of a separate financial security product and deduct the fee associated with that benefit or combination from the unit price. This results in each product having a separate unit price. For example, if there is one optional benefit, the financial service provider will offer two separate products from which it's customers can choose, one having the benefit, one without. This works well if the financial service provider is only providing one or two optional benefits, but having even three optional benefits would result in eight separate products for the financial service provider to track. Thus, the financial service provider will likely be required to charge a much higher fee for offering a substantial array of options.

Financial service providers can alternatively offer one financial security product and keep track of separate unit prices for each possible combination of optional benefits. The financial service provider must determine which of the benefits each investor selected and then deduct the applicable fees associated with the selected combination of benefits. Thus, instead of having one simple unit price for the financial security product, the financial service provider must track a separate unit price for each possible combination of optional benefits. Again, this is feasible with two or three options, but the burden on the financial service provider grows exponentially with the addition of each new option.

In view of the foregoing, it is believed that there is a need in the financial service provider industry for a method to efficiently deduct or charge an investor for the fee (including costs and expenses) associated with managing a financial security product. In addition, there is a need for such a method which will enable the financial service provider to offer optional benefits in conjunction with a financial security without the oppressive burden of maintaining numerous separate share prices or offering separate products for each possible combination of benefits.

SUMMARY OF THE INVENTION

The above needs as well as others are met by a financial security product and method for managing a financial security product, wherein the fees, costs and expenses associated with managing the financial security (including any options or benefits related thereto) are subtracted as a fee from a periodically declared dividend. The unit price of the financial security is preferably reduced by the amount of the declared dividend, and any remaining amount of the dividend after deducting the fee is reinvested in the financial security at the new unit price.

In the preferred embodiment, the financial security product includes one or more optional benefits that may be selected by an investor. The fee deducted from the dividend will vary depending upon the benefits selected by the investor. In this manner, the financial service provider is able to offer a plurality of optional benefits to the investor, while maintaining one price for each unit of the financial security. A financial security product in accordance with this preferred embodiment comprises (1) a plurality of financial security units wherein each unit has an equal value or unit price, and (2) one or more optional benefits that can be selected by an investor wherein a fee associated with managing the financial security unit varies depending upon the optional benefits selected. A dividend is periodically declared with respect to each financial security unit, and at least a portion of the fee is deducted from the periodically declared dividend. Preferably, the unit price of each financial security unit will be decreased by the dividend amount to form a new unit price; and any amount of the declared dividend remaining after deduction of the management fee is reinvested toward the purchase of additional financial security units at the new unit price.

For purposes of this description, it should be understood that "financial security" shall mean any annuity, mutual fund or other investment vehicle in which investors can purchase units, preferably an annuity or mutual fund, and most preferably a variable annuity. "Financial service provider" shall mean any insurance company, bank, investment company, savings and loan, or other financial entity that offers products such as financial securities. "Investor" may mean any individual, corporation, company, trust, estate or other entity capable of having an ownership interest in a financial security. The "optional benefits" may comprise any type of service, waiver, guarantee or other benefit offered in conjunction with a financial security product including various death benefits, waiver of expense charges, guaranteed income and waiver of the contingent deferred sale charge (CDSC).

The "fee" may comprise any fees, expenses, charges or costs associated with managing the financial security. In a preferred embodiment, the fee comprises a base fee which is a minimum fee charged to each investor regardless of the number or kind of optional benefits selected, and an option fee which comprises any additional management fees charged for that particular account, as well as any charges or costs for any optional benefit selected by the investor. As an example, for a variable annuity the financial service provider may charge a base mortality and expense fee to each investor, and provide optional benefits such as various death benefits, waiver of expense charges, guaranteed income and waiver of the contingent deferred sale charge (CDSC) for an option fee.

The entire fee may be subtracted from the declared dividend or only a portion of the fee. In a preferred embodiment, the base fee is periodically subtracted from the unit value or price of the financial security, and the option fee is subtracted from the declared dividend. The dividend amount is preferably at least as large as the maximum potential option fee that may be charged for any combination of optional benefits, and is most preferably larger than the maximum potential option fee in order to enable each investor to reinvest some amount.

The present invention is also directed to a method of accounting for payment of the fee associated with managing a financial security product. This method of accounting comprises the steps of (1) declaring a dividend amount for each unit of the financial security; (2) assessing a pre-dividend unit price for the financial security, wherein each unit is of equal value; (3) subtracting at least a portion of the fee associated with managing the financial security from the dividend amount to result in a dividend remainder; (4) establishing a new unit price for the financial security by subtracting the dividend from the pre-dividend unit price; and (5) reinvesting the dividend remainder by purchasing additional units of the financial security at the new unit price.

Preferably, the portion of the management fees subtracted from the dividend is the amount of an option fee associated with specific optional benefits selected by the investor. The base fee is regularly deducted from the unit price or valuation of the financial security.

DETAILED DESCRIPTION OF PREFERRED EMBODIMENT

The present invention is directed to a financial security product and method for managing a financial security that enables a financial service provider to deduct at least a portion of the fees associated with the financial security from a declared dividend. For purposes of this invention, the financial security can comprise annuities, mutual funds or other investment vehicles used for managing investors' money, preferably annuities or mutual funds, and most preferably variable annuities.

The financial security, such as a variable annuity or a mutual find, is preferably comprised of a plurality of units, wherein each unit is of equal value. A financial service provider manages the financial security for investors. Investors own units of the financial security and are charged a fee, preferably on a per unit basis, to cover expenses and management costs. In order to collect the fee, the financial service provider periodically declares a dividend at the unit level. The fee that has been incurred over the same time period is then deducted from the declared dividend.

In the preferred embodiment of the present invention, the financial security is a variable annuity. The variable annuity comprises a number of annuity units. Each annuity unit represents an equal percentage of the total assets of the variable annuity and as such, each annuity unit has an equal value. Investors can purchase additional annuity units of the variable annuity by sending the financial service provider additional money. As a particular investor invests additional money, additional annuity units are issued to that investor at an amount equal to the money invested divided by the current annuity unit price. It should be understood an investor can be any person or entity that can own an annuity unit of the variable annuity in question. Entities can include, but are not limited to, companies, other financial service providers, trusts, and estates.

It is preferred that assets of the variable annuity be invested in vehicles including, but not limited to, mutual funds, stocks, bonds, and treasury notes. As these investment vehicles change in value, the total valuation of the variable annuity also changes in value. This in turn leads to a change in the valuation of each annuity unit or unit price. For example, if a variable annuity has assets of $1000 and has 100 total outstanding annuity units, each annuity unit is worth $10. If the $1000 in assets are invested in a stock that increases in value by 10%, the variable annuity would now have assets totaling $1100. In addition, each annuity unit of the variable annuity also increases in value by 10% so that each annuity unit would now be valued at $11.

Investors are charged a fee to cover the investment management, optional benefits, and mortality and expense risk costs associated with managing the variable annuity. It is preferred that the fee include a base fee for each annuity unit of the variable annuity. The base fee includes administration charges, which are expenses that cover all of the services involved with the maintenance of the variable annuity, such as asset management, preparation of monthly statements, mailings and other customer services. The base fee is preferably calculated as a predetermined number of basis points per period, although it should be understood that fees could be allocated in any manner known in the art.

A preferred base fee includes a mortality and expense or M&E fee. An M&E fee is a fee that pays for the insurance guarantees; the guaranteed ability to choose a payout option that can provide an income that cannot be outlived at the rates set in the contract at the time of purchase; and the guarantee that the insurance charges will not increase.

In addition to the base fee, it is preferred that the present invention enable the financial service provider to offer optional benefits to their investors. By offering optional benefits, the financial service provider enables their investors to customize each variable annuity product to include only the options the individual investors select. Thus, with each optional benefit selected by the user, an additional option fee per annuity unit is incurred.

The optional benefit could be any option or contract rider the financial service provider chooses to offer. In the preferred embodiment relating to variable annuities, the optional benefits may include, but are not limited to, various death benefits (including, but not limited to, fixed year death benefit step ups, annual death benefit step ups, and growth death benefits), waiver of contingent deferred sales charge (CDSC), guaranteed income, or waiver of expense charges, all of which are known in the art.

It is preferred that each option fee be calculated as a predetermined number of basis points per period. For instance, a financial service provider offers two options in conjunction with its variable annuity. It charges 0.10% of the annuity unit price per period for an annual death benefit step up and 0.05% of the annuity unit price per period for a death benefit option. If an investor decided that he or she would like both options, the investor's option fee would then be 0.15% of the annuity unit price per period. It should be understood that the option fee could alternatively be a fixed amount per annuity unit, variable amount per annuity unit, or could vary depending on the amount of money the investor has in a particular variable annuity.

The present invention enables the investor to pay for the option fees through a dividend declared by the financial service provider. First, it is preferred that the financial service provider deducts the base fees from the annuity unit value prior to declaring a dividend. Next, the financial service provider declares a dividend at the annuity unit level on a periodic basis. The dividend is subtracted from the annuity value calculated on the day the dividend is paid. This results in a post-dividend annuity value. Although, the periodic basis could be any amount of time, it is preferred that the dividend be declared once a month. Then, the financial service provider will subtract the option fees incurred by each individual investor from the dividend. Any remaining dividend is preferably automatically reinvested into the investor's portfolio. This is done just as if it were additional money being invested. The remaining dividend is totaled or divided by the reinvestment price. The reinvestment price for the dividend is the post-dividend annuity unit value. It should be understood that the fees subtracted from the dividend can include base fees in addition to option fees. Furthermore, any remaining dividend could alternatively be distributed directly to the investor.

Through the present invention, financial service providers are capable of adding new options. If the financial service provider determines that there is a need for an optional benefit that it's customers may want, it may simply contact each investor and provide them with the option of selecting the new optional benefit. Under previous methods the financial service provider would need to offer a new product that had a new optional benefit.

As an example of how this works, assume two clients each own 1000 units of Variable Annuity A with a current annuity unit value of $10.25. Their account value is $10,250. Further, assume that Client One has no additional options and Client Two has an option that costs some basis point level that equates to an option fee of $50 or $0.05 per unit (50/1000 units). Next, assume a gross dividend is declared for $0.25 per unit.

Client One will have a net dividend of $0.25 per unit at a reinvestment price of $10.00. The post dividend price is also $10.00. So Client One receives 25 units ($0.25×1000 units/$10) as a dividend and now has 1025 units at $10 per unit, or an account value of $10,250.

Client Two has a net dividend of $0.20 per unit ($0.25 gross dividend−$0.05 option fee) also at a reinvestment price of $10.00. Hence, the client receives 20 units ($0.20× 1000 units/$10) as dividend and now has 1020 units at $10 per unit, or an account value of $10,200 which is $50 less than the account value prior to the dividend.

The declared dividend is a synthetic dividend created by the financial service provider. The size of the dividend must be large enough to equal or exceed the maximum option fee that any client may incur. In addition, it is preferred that the dividend exceed the maximum possible option fee rather than equal it, so that the declared dividend will always result in annuity units being added to each investor's account.

In the preferred embodiment, the financial service provider establishes a static dividend rate for 11 months out of the year. For example, if the maximum amount of option fees an investor can incur in a month is 12 basis points per unit, then the financial service provider could declare a dividend of 15 basis points per annuity unit each month. It is preferred that the dividend be adjusted periodically to bring the total dividends declared in line with the sum of the income and realized capital gain of the underlying investment vehicles.

The periodic adjustment to the dividend is made because the investment vehicles such as stocks or mutual funds, typically declare dividends. By periodically adjusting the dividend, the financial service provider is able to match the sum of the income and realized capital gain of the underlying investment vehicles for the entire year. To calculate the adjusted dividend, the financial service provider determines the total dividend for the underlying account and then subtracts the sum of the dividends paid at the annuity level since the previous adjustment. Should the underlying funds not declare a dividend or declare a dividend that is less than the cumulative amount of monthly dividends declared by the variable annuity, the financial service provider still must declare a dividend at least as large as the maximum option fee.

As previously noted, it is preferred that dividends be paid monthly. In the preferred embodiment, the dividend Record and Declaration Date and the Pay Date will be two consecutive business days toward the end of the month. The option fee for each individual investor will be assessed for the option benefits for the following month. For instance, on January 1 the financial service provider will deduct the option fees from the dividend as prepayment for the optional benefits the client receives in the month of January. A phenomenon occurs around the timing of the dividend and mechanism for charging the option fees. In essence, for purchase type transactions, the customer prepays the benefit but at surrender/withdrawal, the customer may not realize the benefit for the full term paid if surrender occurs prior to the end of the month. For example, assume the customer has requested an option for a stepped-up death benefit costing one basis point monthly. If the client surrenders prior to the last day of the month, he/she would not have benefited from the protection of that option for the full month. To alleviate any concerns respecting this effect, it is preferred that the first net dividend reinvested is equal to the gross dividend reflecting no option fees. For the investor, the compounding effect of the free benefit for the first purchase will normally outweigh the cost of any perceived overcharging for the final month of surrender.

The method of accounting for the payment of the fee using this dividend method is preferably performed with the aid of a programmed computer or other automated system to keep track of the investor's account and payment of fees.

In the preferred method where any remaining dividends are reinvested, it is necessary to first determine the monthly gross dividend, % Mdiv. The % Mdiv is a percentage of the investor's total annuity value. To determine % Mdiv, the financial service provider sets the annual gross dividend yield paid, % Div. The % Mdiv is randomly chosen as a number that exceeds or equals the maximum possible option fee any investor could incur. Then, % Mdiv is found through the following equation:

$$\%Mdiv = \%Div/12$$

Next, to determine the monthly gross dollar dividend per unit, $Div, multiply the annuity unit value on the Record Date, $AUV_r$, by the % Mdiv. This figure is the actual dollar amount per unit of dividend declared.

$$\$Div = AUV_r \times \%Mdiv$$

Once the dividend has been calculated, it is necessary to determine the monthly option fee to be charged to each investor or % Mfee. To find % Mfee, the financial service provider must have the annual cost for each optional benefit. Then, the financial service provider totals the option fees for each investor to arrive at the annual option fee, % Fee, to be charged to the investor. Next, because the investor prepays option fees for the upcoming month's optional benefits, the financial service provider must determine the number of days until the next dividend is declared. With this information, the % Mfee can be calculated using the following equation.

$$\%Mfee = 1-(1\%Fee)^{days/365} \text{(days=number of days until the next dividend date)}$$

With % Mfee calculated, the monthly option fee dollar cost per unit, $Mfee, can be determined. This figure is the actual dollar amount per unit of cost for the investor's optional benefits for the upcoming month. Similar to the formula for calculating the gross dollar dividend per unit or $Div, $Mfee is calculated using the following formula:

$$\$Mfee = AUV_r \times \%Mfee$$

Having calculated the monthly dividend per unit $Div and the cost of optional benefits per unit, $Mfee, the financial service provider can determine the dividend remaining for reinvestment. The following formula calculates the net dollar dividend per unit, $Ndiv:

$$\$Ndiv = \$Div - \$Mfee$$

In order to reinvest the $Ndiv it is necessary to calculate the post dividend unit price, $AUV_p$, i.e., the annuity unit value, AUV, on the Pay Date. This is accomplished by subtracting the dividend per unit, $Div, from the pre-dividend AUV on the Pay Date, EAUV.

$$AUV_p = EAUV - \$Div$$

Finally, the number of units received as a dividend, DivUnits, and the new total number of units owned by the investor after the dividend is paid can be calculated. The financial service provider determines how many units the investor had at the end of the month, Eunits, and multiplies that number times the net dollar dividend per unit, $Ndiv. Then divides that amount by the post dividend unit price, $AUV_p$, as represented by the following formula:

$$DivUnits = \$Ndiv/AUV_p * Eunits$$

The investor's post dividend total units owned, Punits, is determined by adding the number of units owned at the end of the month, Eunits, to the units received as a dividend, DivUnits, as shown in the following formula:

$$Punits = Eunits + DivUnits$$

Note: During leap years, 365 is replaced by 366 in the % Mfee equations.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and sub-combinations are of utility and may be employed without reference to other features and sub-combinations. This is contemplated by and is within the scope of the claims. For example, while the preferred embodiment discloses deducting variable option fees associated with one or more optional benefits selected by the investor from a declared dividend, it is anticipated that a set base fee may be deducted from the declared dividend which does not vary depending upon the benefits selected.

What is claimed and desired to be secured by Letters Patent is as follows:

1. A computerized method for managing an annuity provided to a plurality of investors comprising the steps of:
   determining a record date value of the annuity at an end of a predetermined period;
   declaring a dividend of a predetermined amount based upon the record date value;
   determining a pre-dividend value of the annuity on a dividend pay date; and
   providing a computer programmed to calculate a pay date value of the annuity by subtracting said dividend from said pre-dividend value, subtract a fee from said dividend on the pay date, reinvest any remaining dividend into said annuity at said pay date value, and calculate a post dividend value of said annuity.

2. The computerized method of claim 1, wherein said annuity is comprised of individual units each having an equal value and said record date value is the value of each individual unit of said annuity.

3. The computerized method of claim 1, wherein said annuity includes at least one optional benefit and said fee is charged to each investor based upon the optional benefits selected by the individual investor.

4. The computerized method of claim 3, wherein said dividend is larger than said fee.

5. The computerized method of claim 1, wherein said record date and said pay date are two consecutive days toward the end of the month.

* * * * *

UNITED STATES PATENT AND TRADEMARK OFFICE
CERTIFICATE OF CORRECTION

| | | |
|---|---|---|
| PATENT NO. | : 7,251,623 B1 | Page 1 of 1 |
| APPLICATION NO. | : 09/606495 | |
| DATED | : July 31, 2007 | |
| INVENTOR(S) | : Richard K. Ryan et al. | |

It is certified that error appears in the above-identified patent and that said Letters Patent is hereby corrected as shown below:

<u>Column 6,</u>
Line 47, delete "% Mdiv" and insert -- %Div -- therefor.

Signed and Sealed this

First Day of July, 2008

JON W. DUDAS
*Director of the United States Patent and Trademark Office*